United States Patent [19]

Toyomoto et al.

[11] Patent Number: 5,064,866

[45] Date of Patent: Nov. 12, 1991

[54] SELECTIVELY ION-ADSORPTIVE, POROUS MEMBRANE HAVING SIDE CHAINS CONTAINING BOTH A NEUTRAL HYDROXYL GROUP AND AN ION EXCHANGE GROUP

[75] Inventors: Kazuo Toyomoto, Yokohama; Shoichi Doi; Noboru Kubota, both of Fuji, all of Japan

[73] Assignee: Asahi Kasei Kogyo Kabushiki Kaisha, Osaka, Japan

[21] Appl. No.: 363,939

[22] Filed: Jun. 9, 1989

[30] Foreign Application Priority Data

| Jun. 13, 1988 | [JP] | Japan | 63-143586 |
| Aug. 8, 1988 | [JP] | Japan | 63-196198 |
| Jan. 24, 1989 | [JP] | Japan | 1-013131 |
| Feb. 23, 1989 | [JP] | Japan | 1-041824 |

[51] Int. Cl.$^5$ .................................................. C08J 5/20
[52] U.S. Cl. ........................................ 521/27; 521/30; 521/31; 521/32
[58] Field of Search .................... 521/27, 30, 31, 32

[56] References Cited

U.S. PATENT DOCUMENTS

| 3,247,133 | 4/1976 | Chen | 521/27 |
| 3,741,945 | 6/1973 | Bourat | 521/27 |
| 3,751,376 | 8/1973 | Ouertin | 521/27 |
| 4,137,137 | 1/1979 | Machi et al. | 521/27 |
| 4,196,065 | 4/1980 | Gaussens et al. | 204/159.17 |
| 4,794,002 | 12/1988 | Henis et al. | 424/488 |

FOREIGN PATENT DOCUMENTS

| 1170009 | 7/1984 | Canada | 521/27 |
| 63-143942 | 6/1988 | Japan | 521/27 |

*Primary Examiner*—Thurman K. Page
*Assistant Examiner*—Peter F. Kulkosky
*Attorney, Agent, or Firm*—Birch, Stewart, Kolasch & Birch

[57] ABSTRACT

A selectively ion-adsorptive, porous membrane comprising a membranous, porous resin matrix of a hydrophobic polyolefin or a hydrophobic copolymer of an olefin and a halogenated olefin and a plurality of side chains chemically bonded to both surfaces, which in turn are inclusive of pore wall surfaces, of the membranous porous resin matrix is disclosed. The side chains collectively contain both neutral hydroxyl groups and ion exchange groups. The selectively ion-adsorptive, porous membrane is suitable for use in selective purification or selective removal of desired ionic substances including not only ionic inorganic substances but also an ionic organic substances, such as a protein and an amino acid, on a commercial scale. Further, the selectively ion-adsorptive, porous membrane has not only excellent heat resistance, but also excellent mechanical strength. Therefore, the porous membrane of the present invention can advantageously be used for industrial applications, such as pharmacy, fermentation and the like.

5 Claims, 1 Drawing Sheet

FIGURE
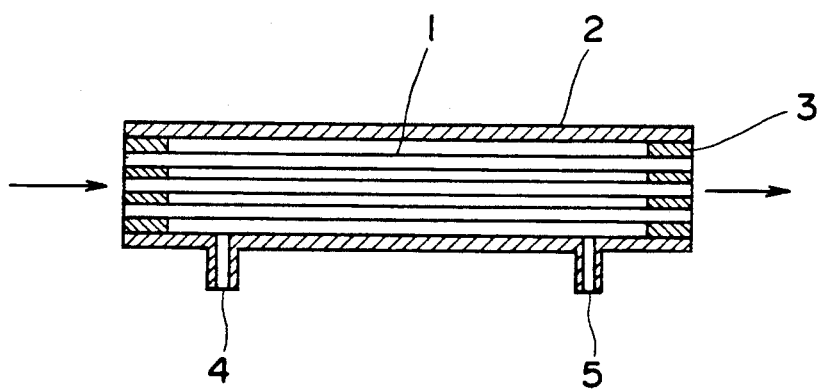

SELECTIVELY ION-ADSORPTIVE, POROUS MEMBRANE HAVING SIDE CHAINS CONTAINING BOTH A NEUTRAL HYDROXYL GROUP AND AN ION EXCHANGE GROUP

BACKGROUND OF THE INVENTION

1. Field of the Invention

The present invention relates to a selectively ion-adsorptive, porous membrane. More particularly, the present invention is concerned with a porous membrane which is suitable for use in the purification or removal of desired ionic substances including not only ionic inorganic substances but also ionic organic substances, such as a protein and an amino acid, by selective adsorption on a commercial scale. The present invention is also concerned with a process for producing the selectively ion-adsorptive, porous membrane.

2. Discussion of Related Art

Generally, an ion exchange resin has been used in a laboratory for selective purification or selective removal of a desired ionic substance, such as a protein and the like, for example by ion exchange chromatography technique in which an ion exchange resin having selective adsorptivity properties is utilized. However, ion exchange chromatography is not advantageous due to its poor efficiency. Further, a large amount of an eluent and a long period of time are required for desorption of an adsorbed substance from the ion exchange resin, leading to a disadvantage in the practice of this method. Therefore, ion exchange chromatography has not been put in practice on a commercial scale.

To solve this problem, it has been suggested that a membrane capable of selectively adsorbing a desired ionic substance be used for purifying the ionic substance. Such a membrane would be advantageous in that the efficiency of its adsorption is excellent and therefore, selective purification and selective removal of a desired substance can be conducted efficiently and the time necessary for purification or removal of a desired substance can be shortened.

In this connection, it is known that in order to selectively purify or remove a desired ionic substance by adsorption, a porous membrane comprising a polymer having a side chain containing an ion exchange group, such as an amino group, a sulfonyl group and a carboxyl group, is suitably used. However, such a porous membrane has a disadvantage in that the membrane adsorbs not only the desired ionic substance but also undesirable substances due to the non-specific adsorptivity of the polymer. Such a non-specific adsorptivity property causes the efficiency in the selective purification or removal to be decreased.

Particularly, for enabling the above-mentioned porous membrane to be used for a commercial-scale purification or removal of a desired substance, the polymer skeleton of the porous membrane must have sufficient mechanical strengths. Therefore, a hydrophobic, porous membrane is preferably used. However, the hydrophobic, porous membrane has a drawback in that non-specific adsorption of a protein and the like is likely to occur, leading to a lowering in the efficiency of purification.

For avoiding the above-mentioned disadvantage, it is preferred that the surface of the hydrophobic membrane be rendered hydrophilic with the aid of a functional group containing a neutral hydroxyl group. The term "neutral hydroxyl group" used herein is intended to define an alcoholic hydroxyl group directly bonded to an aliphatic hydrocarbon. It is not intended to define the hydroxyl group of a carboxylic acid or a hydroxyl group directly bonded to a benzene nucleus, such as a phenolic hydroxyl group. A method for rendering the surface of the hydrophobic membrane hydrophilic is disclosed in, for example, U.S. Pat. No. 4,794,002. In this Patent, it is disclosed that the overall surface of a hydrophobic membrane is coated with a compound having a neutral hydroxyl group and an ion exchange group, or coated with a compound containing a neutral hydroxyl group and having a hydrophilic portion and a hydrophobic portion, followed by the addition of an ion exchange group to the coating layer. However, the addition of the ion exchange group to the surface of the membrane has been conducted physically. Therefore, when the membrane is autoclaved, the added ion exchange group is easily removed from the surface of the membrane. Accordingly, the membrane cannot be used repeatedly. Further, in order to use the membrane repeatedly, it is necessary to desorb the ionic substances which have been adsorbed on the membrane. For performing desorption of the adsorbed ionic substances, the membrane is washed with an alkali solution. However, even when a crosslinking treatment is conducted for the membrane, the membrane still lacks resistance to an alkali and therefore, would not satisfactory for use on a commercial scale. Further, since the coated compound is likely to be cleaved from the membrane by a physical action, the membrane cannot be used repeatedly on a commercial scale.

SUMMARY OF THE INVENTION

The present inventors have made extensive and intensive studies with a view toward solving the above-mentioned problems. As a result, it has unexpectedly been found that when side chains each comprising at least one member selected from the group consisting of a neutral hydroxyl group and an ion exchange group, with the proviso that the chains collectively contain both neutral hydroxyl groups and ion exchange groups, are chemically bonded to both surfaces, which in turn are inclusive of pore wall surfaces of a membranous, porous resin matrix comprising a polyolefin or a copolymer of an olefin and a halogenated olefin, the resultant porous membrane is capable of selectively adsorbing desired ionic substances, including not only ionic inorganic substances, but also ionic organic substances, such as a protein and an amino acid. It has also been found that the above-mentioned membrane has excellent physical properties, such as heat resistance, as compared to a conventional membrane comprising a hydrophobic polymer membrane, having coated thereover a compound having a neutral hydroxyl group and an ion exchange group. Therefore, the porous membrane of the present invention can be used repeatedly for a commercial-scale purification or removal of a desired ionic substance with high selectivity. On the basis of these findings, the present invention has been completed.

Accordingly, it is an object of the present invention to provide a porous membrane which not only has excellent physical properties, such as heat resistance, but is also capable of selectively adsorbing ionic substances, including ionic inorganic substances and ionic organic substances, such as a protein and an amino acid.

It is another object of the present invention to provide a process for producing a porous membrane of the above type, which can easily be practiced.

The foregoing and other objects, features and advantages of the present invention will be apparent to those skilled in the art from the following detailed description and appended claims taken in connection with the accompanying drawing.

BRIEF DESCRIPTION OF THE DRAWING

FIGURE shows a diagrammatical, cross-sectional view of a module comprising a casing and, disposed therein, porous membranes (in a hollow fiber form) of the present invention. The module is prepared and used in Example 1 for evaluating the efficiency of the membrane in selective removal of an ionic substance.

DETAILED DESCRIPTION OF THE INVENTION

Essentially, according to the present invention, there is provided a selectively ion-adsorptive, porous membrane comprising:

a membranous, porous resin matrix comprising a hydrophobic polyolefin or a hydrophobic copolymer of an olefin and a halogenated olefin; and a plurality of side chains each having at least one end chemically bonded directly to both surfaces, which in turn are inclusive of pore wall surfaces, said plurality of side chains each comprising at least one functional group selected from the group consisting of a neutral hydroxyl group and an ion exchange group, with the proviso that said plurality of side chains collectively contain both neutral hydroxyl groups and ion exchange groups, wherein the amounts of said neutral hydroxyl groups and said ion exchange groups are, respectively, 0.1 to 20 milliequivalents and 0.1 to 20 milliequivalents per gram of the porous membrane;

said ion-adsorptive, porous membrane having an average pore diameter of 0.01 to 5 $\mu$m and a porosity of 20 to 90 %.

A membranous, porous resin matrix for the selectively ion-adsorptive, porous membrane of the present invention is comprised of a hydrophobic polyolefin or a hydrophobic copolymer of an olefin and a halogenated olefin, which is suitable from a viewpoint of desired mechanical strength properties.

Examples of hydrophobic polyolefins include a polyethylene, a polypropylene, a polybutylene and the like, and mixtures thereof. Examples of hydrophobic copolymers of an olefin and a halogenated olefin include copolymers of at least two olefins selected from the group consisting of ethylene, propylene, butene, pentene and hexene; and copolymers of at least one olefin of the above-mentioned type and a halogenated olefin, such as tetrafluoroethylene and chlorotrifluoroethylene.

The membranous, porous resin matrix has pores therewithin and openings on both surfaces thereof. The pores cooperate with the openings to form throughpaths running between both the surfaces of the resin matrix. The pores of the membranous, porous resin matrix can be formed by various conventional methods. For example, the pores can be formed by a stretching method in which a membranous resin matrix is stretched or by an etching method in which a membranous resin matrix is exposed to an electron ray and then chemically treated. The pores of the membranous resin matrix formed by the stretching method or the etching method have a simple structure such that the formed pores run directly through the membranous resin matrix in a thicknesswise direction. Further, the pores can also be formed by a micro-phase separation method or a mixing and extraction method described, for example, in Japanese Patent Application Publication Specification No. 40-957, U.S. Pat. No. 3,816,575 and U.S. Pat. No. 4,190,707. The pores formed by the above-mentioned methods assume a three-dimensional network structure of pores. The three-dimensional network structure of pores is most preferred in the present invention. Further, it is preferred that the pore diameter and porosity of the membranous, porous resin matrix be almost the same as or a little larger than those of the final porous membrane of the present invention.

The membranous, porous resin matrix can be in any form, that is, it can be a flat membrane, a tubular membrane and a hollow fiber membrane, and the shape of the membranous, porous resin matrix can suitably be selected according to the use of the final porous membrane. In the present invention, a hollow fiber membrane is most preferred.

According to the present invention, a plurality of side chains are chemically bonded directly to both surfaces, which in turn are inclusive of pore wall surfaces, of the membranous, porous resin matrix. The plurality of side chains each comprise at least one functional group selected from the group consisting of a neutral hydroxyl group and an ion exchange group. That is, each side chain can independently have a neutral hydroxyl group only or an ion exchange group only, and alternatively, each side chain may have both a neutral hydroxyl group and an ion exchange group. However, it is necessary that the plurality of side chains bonded to both surfaces, which in turn are inclusive of pore wall surfaces, of the resin matrix collectively contain both neutral hydroxyl groups and ion exchange groups.

The neutral hydroxyl group is essential for preventing non-specific adsorption of organic substances, such as a protein, on the surface of the porous membrane without causing the denaturation of a feed to be treated with the porous membrane of the present invention. The amount of the neutral hydroxyl groups contained in the plurality of the side chains is specified from the standpoint of the prevention of non-specific adsorption of organic substances. Generally, the side chains collectively contain the neutral hydroxyl group in an amount of 0.1 to 20 milliequivalents, preferably 0.1 to 10 milliequivalents per gram of the porous membrane. When the amount of the neutral hydroxyl group is less than 0.1 milliequivalent per gram of the porous membrane, non-specific adsorption of organic substances, such as a protein, cannot be sufficiently prevented. On the other hand, when the amount of the neutral hydroxyl group is larger than 20 milliequivalents per gram of the porous membrane, the neutral hydroxyl groups on the pore wall surfaces are likely to block the pore spaces, leading to a danger of closure of the pores.

On the other hand, the amount of the ion exchange groups collectively contained in the side chains is generally in the range of from 0.1 to 20 milliequivalents per gram of the porous membrane, preferably in the range of from 0.1 to 10 milliequivalents per gram of the porous membrane. When the amount of ion exchange group is less than 0.1 milliequivalent per gram of the porous membrane, the ion exchange effect is not satisfactory. On the other hand, when the amount of the ion exchange group is more than 20 milliequivalents per gram of the porous membrane, the ion exchange groups on the pore wall surfaces are likely to block the pore spaces, leading to a danger of closure of the pores.

The porous membrane of the present invention preferably has an average pore diameter of 0.01 to 5 μm, more preferably 0.01 to 1 μm from the standpoint of the desired selective ion-adsorptivity and water permeability of the membrane. When the average pore diameter is too small, the water permeability is decreased. When the average pore diameter is too large, some of desired ionic substances would not be adsorbed on the pore wall surface of the porous membrane, but would pass through the pores of the porous membrane without contacting the pore wall surface, so that the selective adsorption of the ionic substance cannot be attained.

In the present invention, an average pore diameter is determined according to a customary air flow method as described in ASTM F 316-70.

The porosity of the porous membrane of the present invention is preferably in the range of from 20 to 90 %, more preferably 50 to 90 %. The porosity is determined as follows. The weight $(W_1)(g)$ of the membrane after it has been saturated with water, and the weight $(W_2)(g)$ of the membrane after it has been dried are individually measured. The porosity of the porous membrane is calculated from the weights $W_1$ and $W_2$ by the following formula, assuming that the density of water is 1.0 g/ml:

$$\text{Porosity } (\%) = \frac{(W_1(g) - W_2(g)) \div g/ml}{\text{apparent membrane volume(ml)}} \times 100.$$

When the porosity is less than 20 %, the water permeability of the porous membrane is disadvantageously decreased. On the other hand, when the porosity is larger than 90 %, the mechanical properties of the porous membrane are lowered.

According to the present invention, the plurality of side chains each independently comprise at least one combination of groups selected from the group consisting of a combination of groups (a) and (b), a combination of groups (a), (c) and (d), a combination of groups (a), (b), (c) and (d), a combination of groups (a), (b) and (e) and a combination of groups (a), (b), (d) and (e). The groups (a) to (e) are represented by the following formulae.

Group (a)

wherein each of $R^1$ and $R^2$ independently represents a hydrogen atom, a halogen atom, an alkyl group having 1 to 3 carbon atoms or a substituted alkyl group having 1 to 3 carbon atoms, Group (b)

wherein $R^3$ has the same meaning as defined with respect to each of $R^1$ and $R^2$, Group (c)

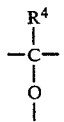

wherein $R^4$ has the same meaning as defined with respect to each of $R^1$ and $R^2$, Group (d):

wherein each of $R^5$ and $R^6$ has the same meaning as defined with respect to each of $R^1$ and $R^2$, and X represents an ion exchange group, Group (e):

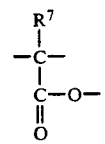

wherein $R^7$ has the same meaning as defined with respect to each of $R^1$ and $R^2$.

In the above-mentioned combinations of groups, group (d) is bonded to the oxy group of groups (c) or (e) directly or through at least one of groups (a) and (b).

In the above-mentioned formulae, the type of halogen atom is not specifically restricted. Further, the type of the substituent of the substituted alkyl group is not specifically restricted, and the substituent can, for example, be a halogen atom, a hydroxyl group and the like. It is preferred that the alkyl group or the alkyl moiety of the substituted alkyl group has 1 to 3 carbon atoms. When the number of carbon atoms is 4 or greater, the hydrophilicity of the side chain is lowered.

The side chain may further comprise an amide linkage and a urethane linkage.

In the present invention, it is most preferred that the plurality of side chains each independently consist essentially of at least one combination of groups which is selected from a combination of groups (a) and (b), a combination of groups (a), (c) and (d) and a combination of groups (a), (b), (c) and (d), wherein group (d) is bonded to the oxy group of group (c) directly or through at least one of groups (a) and (b). When the side chain consists essentially of at least one of the above-mentioned combinations, the chain structure of the side chain is comprised substantially only of carbon-carbon single bonds and ether bonds, and the neutral hydroxyl groups and the ion exchange groups are directly bonded to the chain structure. Such a side chain is chemically stable, and the membrane comprising the resin matrix and a plurality of side chains of the type mentioned above has relatively excellent resistance to acid and alkali as compared to the porous membrane comprising a plurality of side chains containing an ester linkage and the like which are likely to be cleaved by chemical treatment.

In any of the above-mentioned combinations of groups (a) to (e), the arrangement of groups (a) to (e) in the side chain is not limited. Further, the number of each of groups (a) to (e) in the side chain is also not limited. However, it is preferred that the number of group (c) be equal to or smaller than the total number of groups (a) and (b).

One end of the side chain is chemically bonded directly to the surface of the membranous resin matrix. The other end of the side chain can be a free end or can be chemically bonded directly to the surface of the membranous resin matrix. When the other end is a free end, the type of a substituent bonded to the free end is not specifically limited. Examples of substituents include the same type of substituent as defined with respect to $R^1$, or a hydroxyl group.

As an ion exchange group, there may be mentioned an anion exchange group and a cation exchange group. Examples of anion exchange groups include amino groups represented by the following formulae (I) and (II):

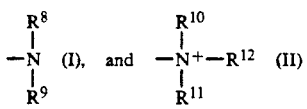

wherein each of $R^8$ and $R^9$ independently represents a hydrogen atom, an alkyl group, a substituted alkyl group, an aryl group and a substituted aryl group, and each of $R^{10}$, $R^{11}$ and $R^{12}$ independently represents an alkyl group, a substituted alkyl group, an aryl group and a substituted aryl group.

In the above-mentioned formulae, the number of carbon atoms of each of the alkyl group, substituted alkyl group, aryl group and substituted aryl group is not limited. The larger the total number of carbon atoms of groups $R^8$ and $R^9$, or $R^{10}$, $R^{11}$ and $R^{12}$ bonded to nitrogen (N), the stronger the basicity of the amino group becomes, causing the ion exchange capacity to be increased. However, the total number of carbon atoms of groups $R^8$ and $R^9$, or $R^{10}$, $R^{11}$ and $R^{12}$ is too large, the hydrophobicity is disadvantageously increased so that the non-specific adsorption of organic substances, such as a protein, on the porous membrane occurs. The total number of carbon atoms of groups $R^8$ and $R^9$ is preferably 0 to 50, and the total number of carbon atoms of groups $R^{10}$, $R^{11}$ and $R^{12}$ is preferably 3 to 50.

With respect to the substituted alkyl group and the substituted aryl group, the type of the substituent group is not limited, but there may be mentioned, for example, a halogen atom and a neutral hydroxyl group.

The amino group represented by formula (I) can be reversibly converted to an ammonium ion group simply by changing the pH in the manner shown by the following formula. Therefore, the amino group to be contained as an ion exchange group in the porous membrane of the present invention can be such an ammonium group:

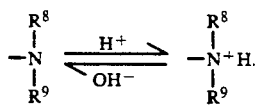

The porous membrane containing the anion exchange groups can be used for selective purification or selective removal of an anionic substance.

Examples of cation exchange groups include a sulfonyl group and a carboxyl group which are respectively represented by following formulae (III) and (IV):

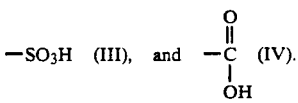

In the case of the sulfonyl group, in a solution of an ordinary pH range, i.e., 1 to 14, the sulfonyl group is easily dissociated to form a cationic group represented by the formula: $-SO_3^-$. Therefore, the sulfonyl group to be contained in the porous membrane of the present invention can be a cationic sulfonyl group.

With respect to the carboxyl group also, it can be easily dissociated to form a carboxylate group represented by the formula: $-COO^-$. Both the carboxyl group and carboxylate group are reversibly converted to each other simply by changing the pH in the following manner:

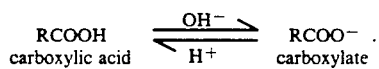

Therefore, in the present invention, the carboxyl group can be a carboxylate group. (see, R. T. Morrison and R. N. Boyd, "Organic Chemistry", the third edition, volume 2 (1977), p. 726, published by Tokyo Kagaku Dojin K. K., Japan).

The porous membrane containing the cation exchange groups can be used for selective purification or selective removal of a cationic substance.

Representative illustrative examples of side chains are shown below.

(1) The side chains containing both neutral hydroxyl groups and ion exchange groups:

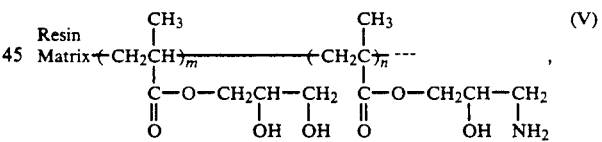

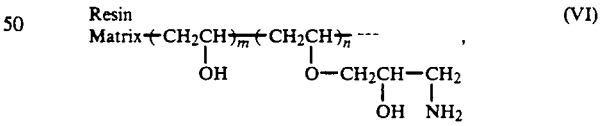

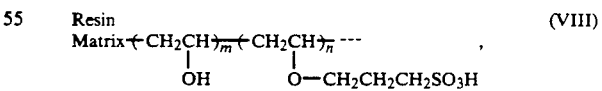

and

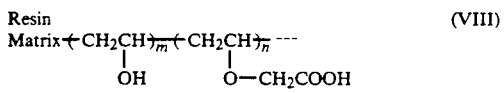

wherein m and n are each an integer of 0 or more with the proviso that $m+n \geq 1$.

(2) Side chains containing only neutral hydroxyl groups:

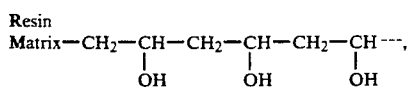

(IX)

and

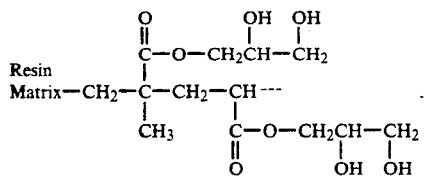

(X)

(3) Side chains containing only ion exchange groups:

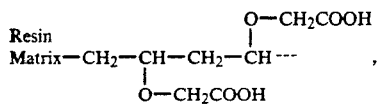

(XI)

and

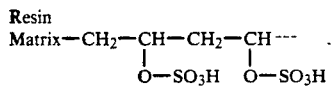

(XII)

The presence of each of the neutral hydroxyl group, ion exchange group, carbon atoms of groups (a), (b), (c), (d) and (e) having only single bonds, ether group of group (c), ester linkage of group (e), amide linkage and urethane linkage in the side chains chemically bonded to the surface of the membranous, porous resin matrix can be detected by the IR spectrophotometry and NMR spectrometry as described in, for example, "Method for Identification of Organic Compounds by Spectrometry", 1976, published by Tokyo Kagaku Dojin K. K., Japan.

In the present invention, each of the amounts (milliequivalent per gram of the porous membrane) of the neutral hydroxyl groups and the ion exchange groups is determined based on the value obtained by the chemical analysis of the porous membrane with respect to 0.1 to several grams of the membrane as a sample in order to avoid any error due to the non-uniform distribution of the groups in the microstructure of the membrane.

The amount of the neutral hydroxyl groups contained in the side chains can be determined as follows. A given quantity of the porous membrane is allowed to react with acetic anhydride in pyridine, and the amount of the anhydride consumed by the reaction or the weight increase of the porous membrane is measured. From the amount of the consumed acetic anhydride or the weight increase of the porous membrane, the amount of the neutral hydroxyl groups is calculated.

Further, the amount of the ion exchange groups contained in the side chains can be determined by a customary method for the determination of the ion exchange group in an ion exchange resin, which is described in, for example, "Practical Ion Exchange", revised and enlarged edition, 1984, published by Kagaku Kogyosha K. K., Japan, pp. 167-174. The outline of the method is explained below.

A. Strongly Basic Anion Exchange Group

Amino group represented by formula (II)

(1) The porous membrane is immersed in an aqueous NaOH solution to change all of the amino groups to the groups of the type:

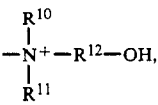

wherein $R^{10}$, $R^{11}$ and $R^{12}$ have the same meanings as mentioned before.

(2) The resultant porous membrane is washed with water to wash out the excess NaOH.

(3) The resultant membrane is immersed in an aqueous NaCl solution to advance a reaction represented by the following formula:

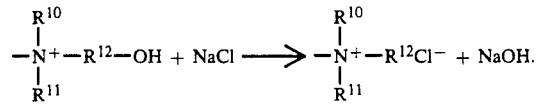

Then, the amount of the formed NaOH is measured by neutralization titration with an acid. Based on the titer, the amount of the amino groups is determined.

B. Weakly Basic Anion Exchange Group

Amino Group Represented by Formula (I)

(1) The porous membrane is immersed in an aqueous NaOH solution to change all of the amino groups to the groups of the type:

wherein $R^8$ and $R^9$ have the same meanings as mentioned before.

(2) The resultant porous membrane is washed with water to wash out the excess NaOH.

(3) The resultant porous membrane is immersed in an aqueous HCl solution to advance a reaction represented by the following formula:

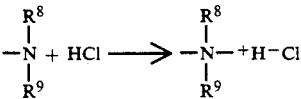

or

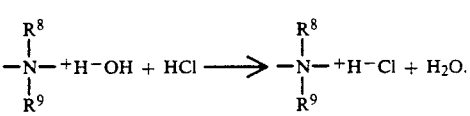

Then, the amount of the HCl remaining unconsumed is measured by neutralization titration with an alkali. Based on the titer, the amount of the amino groups is determined.

C. Strongly Acidic Cation Exchange Group (Sulfonyl Group)

(1) The porous membrane is immersed in an aqueous HCl solution to change all of the groups $-SO_3^-$ to groups $-SO_3H$.

(2) The resultant porous membrane is washed with water to remove the excess HCl.

(3) The resultant porous membrane is immersed in an aqueous NaCl solution to advance a reaction represented by the following formula:

$$-SO_3H + NaCl \rightarrow -SO_3Na + HCl.$$

Then, the amount of the formed HCl is measured by neutralization titration with an alkali. Based on the titer, the amount of the sulfonyl groups is determined.

D. Weakly Acidic Cation Exchange Group

Carboxyl Group (1) The porous membrane is immersed in an aqueous HCl solution to change all of the groups $-COO^-$ to groups $-COOH$.

(2) The resultant porous membrane is washed with water to remove the excess HCl.

(3) The resultant porous membrane is immersed in an aqueous NaOH solution to advance a reaction represented by the following formula:

$$-COOH + NaOH \rightarrow -COONa + H_2O$$

Then, the amount of the NaOH remaining unconsumed is measured by neutralization titration with an acid. Based on the titer, the amount of the carboxyl groups is determined.

The porous membrane of the present invention may be in any form, that is, it can be a flat membrane, a hollow fiber membrane or a tubular membrane. Among these forms, a hollow fiber membrane is preferred, because it has a large effective surface area, and a cross-flow filtration can be conducted without the danger of a clogging of the membrane. From the viewpoint of the effective membrane surface area, mechanical strength and filtration performance, the most preferred is a hollow fiber membrane having an inner diameter of 0.05 to 10 mm and a membrane thickness of 0.05 to 5 mm.

In another aspect of the present invention, there is provided a process for producing the above-mentioned selectively ion-adsorptive, porous membrane.

The porous membrane of the present invention can be produced by various processes. A suitable process is chosen according to the type of an ion exchange group. Examples of processes which are advantageous from the standpoint of the ease in controlling the reactions and economy, include the following processes.

(A) Process for Producing a Porous Membrane Containing Anion Exchange Groups Process (I) The process consists in:

(1) exposing a membranous, porous resin matrix of a polyolefin or a copolymer of an olefin and a halogenated olefin to ionizing radiation;

(2) graft-polymerizing at least one member selected from the group consisting of a glycidyl methacrylate and a glycidyl acrylate onto the ionizing radiation-exposed resin matrix in a vapor phase;

(3) treating the graft-polymerized ionizing radiation-exposed resin matrix having grafted thereon recurring polymeric units of glycidyl methacrylate or glycidyl acrylate with an acid solution to partially open the epoxy rings of the graft-polymerized resin matrix; and (4) subjecting the epoxy rings of the glycidyl methacrylate or glycidyl acrylate remaining unopened to reaction with ammonia or an organic amine, to form anion exchange groups and thereby obtain a porous membrane.

The exposure of a membranous, porous resin matrix to ionizing radiation may generally be conducted in vacuo or in an atmosphere of an inert gas. For ionizing radiation, electron rays or gamma rays are preferably used.

In step (1), the exposure of the resin matrix to ionizing radiation is generally conducted under the following conditions:

Radiation dose : 0.1–50 Mrad.

Radiation temperature : 40° C. or lower.

The purpose of the exposure to ionizing radiation is to form radicals in the membranous, porous resin matrix.

In step (2), the graft-polymerization is performed by reacting the radicals formed in step (1) with a vinyl monomer, such as glycidyl methacrylate or glycidyl acrylate in vapor phase. The graft-polymerization can generally be conducted at $-30$ to $80°$ C. under reduced pressure. The reaction time is not specifically limited and varied according to the reactivity and volatility of the monomer to be grafted. Generally, the reaction is completed within one week.

In step (2), at least one member selected from the group consisting of glycidyl methacrylate and a glycidyl acrylate is grafted onto the ionizing radiation-exposed resin matrix at both surfaces thereof, which in turn are inclusive of pore wall surfaces. If desired, a functional monomer, such as triethylene glycol dimethacrylate which has two or more of polymerizable groups, can be grafted together with the above-mentioned vinyl monomers.

Thus, recurring polymeric units of glycidyl methacrylate or glycidyl acrylate are grafted onto the resin matrix.

Each of the recurring polymeric units has one epoxy group remaining unreacted by the graft copolymerization.

In step (3), the resin matrix having grafted thereon recurring polymeric units of glycidyl methacrylate or glycidyl acrylate is treated with an acid solution, such as an aqueous sulfuric acid solution, to partially open the epoxy rings of the graft-polymerized resin matrix. The number of the epoxy rings to be opened can be adjusted by appropriately selecting the time and temperature for the acid solution treatment. Generally, the treatment can be conducted at room temperature to about 120 ° C. for several minutes to several hours using, for example, a dilute sulfuric acid of about 0.1 N. By the acid solution treatment, two neutral hydroxyl groups per opened epoxy ring are formed.

In step (4), the epoxy groups of the glycidyl methacrylate or glycidyl acrylate remaining unopened are reacted with ammonia or an organic amine, so that the epoxy ring is opened and an amino group is formed on the opened epoxy ring. Simultaneously with the formation of an amino group, one neutral hydroxyl group is formed on the opened epoxy ring.

Examples of organic amines include aliphatic amines, for example, monoamines, such as methylamine, dimethylamine and trimethylamine, and diamines, such as ethylenediamine; and aromatic amines, such as aniline, methyl aniline, dimethyl aniline, toluidine, anisidine, chloroaniline, bromoaniline and nitroaniline. The ammonia or organic amine may generally be used in the form of a solution in an appropriate solvent which does not dissolve the resin matrix. Examples of solvents for the ammonia and organic amines include water, an alcohol, a mixture of water and alcohol, dimethylsulfoxide and the like. When a liquid amine such as triethylamine or ethylenediamine is used, it may be used as such without being dissolved in any solvent. The concentration of the ammonia and the organic amine in a solution thereof may generally be about 3 to 40 % by weight and about 3 to 100 % by weight, respectively.

The conditions for the reaction of the epoxy groups with ammonia or an organic amine are varied according to the type of reactant (ammonia and an organic amine) and the intended amount of ion exchange group to be introduced into the side chains. Generally, the reaction may be conducted at 0° to 20 ° C. for one minute to one week.

The amount of the epoxy groups of the side chains of the porous membrane can be determined as follows. One gram of the membrane is immersed in an aqueous sodium thiosulfate and heated. The thus formed $OH^-$ is titrated with 0.1N HCl using phenolphthalein as an indicator to measure the amount of the formed $OH^-$. Based on the amount of the $OH^-$, the amount of the epoxy groups is determined.

When the introduced amino group is a primary amino group, a secondary amino group or a tertiary amino group, if desired, it may be reacted with an aliphatic compound having 1 to 20 carbon atoms substituted with at least one halogen atom to convert the amino group to a quaternary amino group.

A representative example of a side chain of the porous membrane produced by Process (I) is one which is represented by formula (V) shown before.

Process (II) The process consists in:
(1) exposing a membranous, porous resin matrix of a polyolefin or a copolymer of an olefin and a halogenated olefin to ionizing radiation;
(2) graft-polymerizing vinyl acetate onto the ionizing radiation-exposed resin matrix in a vapor phase;
(3) subjecting the graft-polymerized ionizing radiation-exposed resin matrix having grafted thereon recurring polymeric units of vinyl acetate to saponification to thereby convert the vinyl acetate units into recurring polymeric units of vinyl alcohol;
(4) introducing epoxy groups into the vinyl alcohol units by reacting the vinyl alcohol units with a haloepoxide or a bisepoxide; and
(5) subjecting the epoxy groups to reaction with ammonia or an organic amine, to form anion exchange groups and thereby obtain a porous membrane.

In step (1), the exposure of a membranous, porous resin matrix to ionizing radiation is conducted in the same manner as in step (1) of Process (I).

In step (2), vinyl acetate is graft-copolymerized onto the ionizing radiation-exposed resin matrix in a vapor phase so that recurring polymeric units of vinyl acetate are grafted onto the resin matrix at both surfaces thereof, which in turn are inclusive of pore wall surfaces. The graft-polymerization may generally be conducted at −30° to 80 ° C. under reduced pressure. The reaction time is not specifically limited. Generally, the reaction is completed within one week.

In step (3), the grafted recurring units of vinyl acetate are saponified by a customary method to convert these units to recurring units of vinyl alcohol. The saponification may generally be conducted by contacting the membrane with a solution of an alkali, such as sodium hydroxide or potassium hydroxide, in water or a mixture of water and an alcohol at 0° to 100 ° C. for 30 min to one week. The molar amount of an alkali to be used for the saponification may generally be not smaller than the molar amount of the grafted vinyl acetate.

In step (4), epoxy groups are introduced into the vinyl alcohol units grafted on the resin matrix by reacting the vinyl alcohol units with a haloepoxide or a bisepoxide. As a haloepoxide, there may be used, for example, an epihalohydrin, preferably, epichlorohydrin. As a bisepoxide, there may be used, for example, 1,4-bis-(2,3-epoxypropoxy)butane.

The introduction of the epoxy groups into the vinyl alcohol units may be conducted in an aprotic, polar organic solvent, such as dimethylsulfoxide.

Since the reaction can be promoted in the presence of an alkali, an aqueous alkali solution, such as an aqueous sodium hydroxide solution, can be added to the reaction system, if desired.

Preferred conditions for the introduction of the epoxide to the recurring polymeric units of vinyl alcohol are as follows. The membrane is immersed in a mixture of dimethylsulfoxide and epichlorohydrin. The amounts of dimethylsulfoxide and epichlorohydrin are, respectively, in amounts of 1 to 10 times and 1 to 5 times the weight of the dry membrane. To the resultant mixture is added an alkali in an amount of 1 to 100 % by weight based on the amount of epichlorohydrin. The reaction may generally be conducted at 0° to 100 ° C. for several minutes to 12 hours.

The amount of the bonded epoxy groups can be determined as follows. One gram of the porous membrane is immersed in an aqueous sodium thiosulfate and heated. The thus formed $OH^-$ is titrated with 0.1N HCl using phenolphthalein as an indicator to measure the amount of the formed $OH^-$. Based on the amount of the $OH^-$, the amount of the epoxy groups is determined.

In step (5), the epoxide is reacted with an amine to form an anion exchange group. As an amine, ammonia or an organic amine of the type mentioned above can be used. The ammonia and organic amine can be used in the form of a solution thereof in an appropriate solvent as mentioned above which does not dissolve the resin matrix. The reaction can be conducted, for example, as follows. The epoxide-bonded membrane is immersed in an ammonia solution or an organic amine solution so that the epoxy rings are opened and amino groups are bonded to the recurring polymeric units of vinyl alcohol grafted onto the resin matrix. The ammonia concentration of an ammonia solution is preferably in the range of about 3 to 40 % by weight. In the case of an organic amine, an organic amine solution having a concentration of about 3 to 100 % by weight may be used.

With respect to the neutral hydroxyl group, the amount of the neutral hydroxyl groups is decreased by the introduction of the epoxy groups to the vinyl alcohol units grafted onto the resin matrix. However, by the reaction of the epoxide with ammonia or an organic amine, a neutral hydroxyl group is newly formed. The neutral hydroxyl group newly formed by the reaction of the epoxide with ammonia or an organic amine is in a position adjacent to the amino group and, due to the presence of such an adjacent neutral hydroxyl group, the non-specific adsorption of ionic substances on the side chain can be sufficiently prevented.

When the introduced amino group is a primary amino group, a secondary amino group or a tertiary amino group, the amino group can, if desired, be reacted with an aliphatic compound substituted with at least one halogen atom to convert the amino group to a quaternary amino group.

A representative example of a side chain of the porous membrane produced according to Process (II) is one which is represented by formula (VI) shown before.

(B) Process for Producing a Porous Membrane Containing Cation Exchange Groups

Process (III) The process consists in:

(1) exposing a membranous, porous resin matrix of a polyolefin or a copolymer of an olefin and a halogenated olefin to ionizing radiation;

(2) graft-polymerizing vinyl acetate onto the ionizing radiation-exposed resin matrix in a vapor phase;

(3) subjecting the graft-polymerized ionizing radiation-exposed resin matrix having grafted thereon recurring polymeric units of vinyl acetate to saponification to thereby convert the vinyl acetate units into recurring polymeric units of vinyl alcohol; and (4) subjecting the vinyl alcohol units to reaction with propanesultone, to form sulfonyl groups as cation exchange groups and thereby obtain a porous membrane.

The exposure of a membranous, porous resin matrix to ionizing radiation in step (1), the graft-copolymerization of vinyl acetate on the resin matrix in step (2) and the saponification of the recurring polymeric units of vinyl acetate grafted onto the resin matrix for converting these units into recurring polymeric units of vinyl alcohol in step (3) are conducted in the same manner as described with respect to steps (1), (2) and (3) of Process (II).

In step (4), the vinyl alcohol units are reacted with propanesultone. If desired, the reaction may be conducted in a solvent, such as 1,2-dichloroethane, which neither dissolves the resin matrix nor acts on propanesultone. The reaction can be promoted in the presence of a basic catalyst. Therefore, if desired, sodium hydroxide or an organic amine can be added to the reaction system. The reaction can generally be conducted at 0° to 100° C. for several minutes to 24 hours.

A representative example of a side chain of the porous membrane produced according to Process (III) is one which is represented by formula (VII) shown before.

Process (IV) The process consists in:

(1) exposing a membranous, porous resin matrix of a polyolefin or a copolymer of an olefin and a halogenated olefin to ionizing radiation;

(2) graft-polymerizing vinyl acetate onto the ionizing radiation-exposed resin matrix in a vapor phase;

(3) subjecting the graft-polymerized ionizing radiation-exposed resin matrix having grafted thereon recurring polymeric units of vinyl acetate to saponification to thereby convert the vinyl acetate units into recurring polymeric units of vinyl alcohol; and (4) subjecting the vinyl alcohol units to reaction with an aliphatic carboxylic acid substituted with at least one halogen atom, to form carboxyl groups as cation exchange groups and thereby obtain a porous membrane.

The exposure of a membranous, porous resin matrix to ionizing radiation in step (1), the graft polymerization of vinyl acetate on the resin matrix in step (2) and the saponification of the recurring polymeric units of vinyl acetate grafted onto the resin matrix for converting these units into recurring polymeric units of vinyl alcohol in step (3) are conducted in the same manner as described with respect to steps (1), (2) and (3) of Process (II).

In step (4), the polyvinyl alcohol is reacted with an aliphatic carboxylic acid substituted with at least one halogen atom. As the aliphatic carboxylic acid substituted with at least one halogen atom, there may be used those having 1 to 20 carbon atoms. Examples of substituted aliphatic carboxylic acids include monochloroacetic acid, dichloroacetic acid, trichloroacetic acid, monobromoacetic acid, monoiodoacetic acid, monobromopropionic acid, dibromopropionic acid, bromosuccinic acid, dibromosuccinic acid and alkali metal salts thereof. The reaction may generally be conducted in a solvent which is capable of dissolving the aliphatic carboxylic acid. The reaction can be promoted in the presence of an alkali. Therefore, if desired, an alkali, such as sodium hydroxide or potassium hydroxide, may be added to the reaction system.

A preferred mode of step (4) is as follows. A graft-polymerized resin matrix is immersed in an aqueous monochloroacetic acid solution containing a monochloroacetic acid in an amount of 10 % by weight to an amount corresponding to the saturation, to soak the resin matrix with the aqueous monochloroacetic acid solution. Then, the resin matrix is taken out of the solution and immersed in an aqueous sodium hydroxide solution containing sodium hydroxide in an amount larger than a half of the total weight of the monochloroacetic acid impregnated in the resin matrix. The resin matrix is heated in the aqueous sodium hydroxide solution at 30° to 100 ° C. for several minutes to 12 hours. If desired, the above procedure may be repeated so that the amount of carboxyl groups introduced into the porous membrane is increased.

A representative example of a side chain of the porous membrane produced according to Process (IV) is one which is represented by formula (VIII) shown before.

The selectively ion-adsorptive, porous membrane of the present invention is suitable for use in selective purification or selective removal of desired ionic substances including not only an ionic inorganic substance but also an ionic organic substance, such as a protein and an amino acid, on a commercial scale. The porous membrane of the present invention is also excellent in mechanical strength and resistance to heat. Therefore, the porous membrane of the present invention can advantageously be used for industrial applications such as pharmacy and fermentation.

DETAILED DESCRIPTION OF THE PREFERRED EMBODIMENTS

This invention will now be described in detail with reference to the following Reference Example, Examples and Comparative Examples, but they should not be construed as limiting the scope of the present invention.

REFERENCE EXAMPLE

Preparation of Membranous, Porous Resin Matrix 22.1 Parts by weight of finely divided silica (Nip-Sil VN3LP, tradename, manufactured and sold by Nippon Silica K.K., Japan), 55.4 parts by weight of dioctyl phthalate (hereinafter referred to simply as "DOP"), 22.5 parts by weight of polyethylene powder (SH-800, tradename, manufactured and sold by Asahi Kasei Kogyo K.K., Japan) are mixed together. Then, the resultant mixture is subjected to extrusion-molding using a twin-screw extruder having a screw diameter of 30 mm (Model AS-30, manufactured and sold by NAKATANI KIKAI K.K., Japan) to form a hollow fiber having an inner diameter of 1.9 mm and a membrane thickness of 0.60 mm. The hollow fiber is immersed in 1,1,1-trichloroethane for 60 min to extract the DOP from the hollow fiber. Further, the hollow fiber is immersed in an aqueous NaOH solution having an NaOH concentration of 40 % by weight at a temperature of 60 °C. for 20 min to extract the finely devided silica from the hollow fiber. The resultant hollow fiber is washed with water and dried, to thereby obtain a membranous, porous resin matrix (hereinafter referred to simply as "resin matrix").

EXAMPLE 1

The resin matrix obtained in Reference Example is exposed to electron rays at 20 Mrad in an atmosphere of nitrogen by means of an electron accelerator (accelerated voltage : 1.5 Mev, electric current : 1 mA). Then, a glycidyl methacrylate is graft-polymerized onto the electron rays-exposed resin matrix in a vapor phase at 30 °C. for 18 hours. The amount of the glycidyl methacrylate grafted onto the resin matrix is 1.0 milliequivalent per gram of the resultant resin matrix. Since the glycidyl methacrylate has one epoxy group, the amount of the epoxy groups in the grafted recurring units of glycidyl methacrylate is equal to the amount of the glycidyl methacrylate, i.e., 1.0 milliequivalent per gram of the resultant resin matrix.

Then, the resultant resin matrix is immersed in a solution containing 0.1N sulfuric acid dissolved in a mixture of water and ethanol at 30 °C. for 10 hours to partially open the epoxy rings. The amount of the epoxy groups remaining unopened of the recurring polymeric units of glycidyl methacrylate grafted on the resin matrix is determined by the method as mentioned before. As a result, it is found that the amount of the remaining epoxy groups is 0.5 milliequivalent per gram of the resultant membrane, that is, the 50 % of the epoxy groups have been ring-opened.

The thus obtained partially epoxy ring-opened glycidyl methacrylate units grafted onto the resin matrix is sufficiently washed with water. Then, the grafted polymer is allowed to react with dimethylamine at 80 °C. for 2 hours and further with ethylene chlorohydrin at 80 °C. for 24 hours, to thereby obtain a porous membrane. The amounts of neutral hydroxyl groups and amino groups, the porosity and the average pore diameter of the above-obtained porous membrane are determined in the same respective methods as mentioned before. As a result, it is found that the porous membrane comprises a neutral hydroxyl groups in an amount of 1.5 milliequivalents per gram of the porous membrane and amino groups in an amount of 0.4 milliequivalent per gram of the porous membrane, and has a porosity of 70% and an average pore diameter of 0.35 $\mu$m.

Using the thus obtained porous membrane, a module having a membrane surface area of 1 m², as diagrammatically illustrated in Figure, is prepared. The module comprises plastic-made cylindrical casing 2 having filtrate outlets 4 and 5, and 160 hollow fiber porous membranes 1 having an effective length of 1 m which are arranged substantially in parallel relationship and bonded together at both end portions thereof by means of bonding agent 3 to form a bundle. The bundle is also bonded to casing 2 at their both ends by bonding agent 3. A feed is flowed through the module in a direction shown in Figure by an arrow.

An aqueous NaOH solution (pH 13) is flowed through the module. The module is washed with distilled water until the filtrate passed through the hollow fiber membranes becomes neutral. Then, as a feed, an aqueous solution containing 2.0 % by weight of glucose and 1.0 ppm of chlorine ion is flowed through the module at a flow rate of 20 l/hr.m² and a filtrate having passed through the hollow fiber membranes is collected from the filtrate outlets 4 and 5. After the filtration for 20 min, the concentrations of the glucose and chlorine ion in the filtrate are found to be 2.0 % by weight and 0 ppm, respectively. This shows that the chlorine ion is selectively removed. After further conducting the filtration for 1 hour, the module is washed with an aqueous NaOH solution (pH 13). Using the washed module, the filtration is conducted again in substantially the same manner as mentioned above. As a result, it is found that the capacity for removal of a chlorine ion by the adsorption thereof on the membrane is substantially unchanged.

COMPARATIVE EXAMPLE 1

The glycidyl methacrylate units-grafted membrane as obtained in Example 1 is immersed in a solution containing 0.1N sulfuric acid dissolved in a mixture of water and ethanol at 30 °C. for 24 hours, to completely open the epoxy rings of the membrane. The above-obtained porous membrane is examined in the same manner as mentioned before. As a result, it is found that the porous membrane comprises neutral hydroxyl groups in an amount of 2.1 milliequivalents per gram of the porous membrane, and has a porosity of 70 % and an average pore diameter of 0.35 $\mu$m.

Using the above obtained-membrane, a module having a membrane surface area of 1 m² as described in Example 1 is prepared. Then, a feed is flowed through the module in substantially the same manner as in Example 1. 20 Minutes later, the concentrations of the glucose and chlorine ion in the filtrate are found to be 2.0 % by weight and 1.0 ppm, respectively. That is, both the glucose and chlorine ion are not adsorbed on the porous membrane.

EXAMPLE 2

The resin matrix obtained in Reference Example is exposed to electron rays at 20 Mrad in an atmosphere of nitrogen by means of a electron accelerator (accelerated voltage : 1.5 Mev, electric current : 1 mA). Then, vinyl acetate is graft-polymerized onto the electron rays-exposed resin matrix in a vapor phase at 0 °C. for 30 hours.

Then, the resultant resin matrix is treated with 0.1 N aqueous NaOH solution at 80 °C. for 10 hours. Whether or not the reaction is completed is confirmed by monitoring the decrease in weight of the matrix.

Thus, there is obtained a polyvinyl alcohol-grafted resin matrix (hereinafter referred to simply as "PVA-grafted matrix") containing a neutral hydroxyl group in an amount of 5.2 milliequivalents per gram of the PVA-grafted matrix, and having a porosity of 70 % and an average pore diameter of 0.37 $\mu$m.

The PVA-grafted matrix is sufficiently washed with water and treated with a mixture consisting of dimethylsulfoxide, epichlorohydrin and 50 % by weight of an aqueous sodium hydroxide solution, respectively, in amounts of 500 ml, 300 ml and 70 ml per 50 g of the porous membrane, at 30° C. for 5 hours. After completion of the reaction, the membrane is washed with methanol and further washed with water.

One gram of the resultant porous membrane is immersed in 1.3 M aqueous sodium thiosulfate solution and heated at 70° C. to form OH$^-$ ion. The amount of the OH$^-$ ion is determined by neutralization titration with 0.1 N HCl using a phenolphthalein as an indicator. Based on the amount of the OH$^-$ion, the amount of the epoxy groups of the porous membrane is calculated. As a result, it is found that the amount of the epoxy groups is 0.5 milliequivalent per gram of the porous membrane.

The porous membrane is immersed in an aqueous ammonia solution having an ammonia concentration of 29 % by weight for 24 hours and further immersed in 0.1 N HCl to form a quaternary amine.

The thus obtained porous membrane is examined in the same manner as mentioned before. As a result, it is found that the porous membrane comprises neutral hydroxyl groups in an amount of 5.0 milliequivalents per gram of the porous membrane and amino groups in an amount of 0.4 milliequivalent per gram of the porous membrane, and has a porosity of 70% and an average pore diameter of 0.35 μm.

Using the porous membrane, a module having a membrane surface area of 1 m2 as described in Example 1 is prepared. Then, as a feed, a solution containing 600 ppm of horse hemoglobin (pH 8.65) is flowed through the module at a flow rate of 20 l/hr.m$^2$ to obtain a filtrate 20 Minutes later, the concentration of the horse hemoglobin in the filtrate is found to be 0.5 ppm. This shows that the horse hemoglobin is selectively adsorbed on the hollow fiber porous membrane. After further flowing a feed for 1 hour, the solution is discharged from the module. An aqueous HCl solution (pH 1) is flowed through the module and the filtrate is collected. The amount of the horse hemoglobin in the collected filtrate is found to be 96 % of the theoretical amount calculated based on the amount of ion exchange groups.

Then, the above-mentioned module is washed with an aqueous alkali solution (pH 14) and, further treated with an aqueous HCl solution (pH 1). Using the above-treated module, the filtration of a feed is conducted in substantially the same manner as mentioned above. As a result, it is found that the concentration of the horse hemoglobin in the filtrate is 0.6 ppm. This shows that the capacity for selective anion-adsorption is maintained even after the washing of the membrane with an alkali solution.

The flowing of a feed through the module is repeatedly conducted 100 times in substantially the same manner as mentioned above. However, the capacity for the selective anion-adsorption is substantially unchanged.

COMPARATIVE EXAMPLE 2

Using the PVA-grafted matrix as obtained in Example 2 which does not contain ion exchange groups, a module having a membrane surface area of 1 m$^2$ as described in Example 1 is prepared. Then, a feed is flowed through the module in substantially the same manner as in Example 2. 20 Minutes later, the concentration of horse hemoglobin in the filtrate is found to be 597 ppm. That is, substantially no horse hemoglobin is adsorbed on the membrane.

EXAMPLE 3

To the PVA-grafted matrix as obtained in Example 2 is added propanesultone in a weight amount 20 times that of the PVA-grafted matrix and the reaction is conducted at 80° C. for 10 hours. Then, the resultant membrane is washed with water and further washed with an aqueous 1 N NaOH solution at 80° C. for 1 hour. After the washing, the membrane is immersed in 1 N aqueous HCl solution for 2 hours and washed with water. The thus obtained porous membrane comprises neutral hydroxyl groups in an amount of 4.5 milliequivalents per gram of the porous membrane and sulfonyl groups in an amount of 0.4 milliequivalent per gram of the porous membrane, and has a porosity of 70% and an average pore diameter of 0.35 μm.

Using the porous membrane, a module having a membrane surface area of 1 m$^2$ as described in Example 1 is prepared.

Then, as a feed, a solution containing 600 ppm of a cytochrome C (pH 8.4) is flowed through the module at a flow rate of 20 l/hr.m$^2$. 20 Minutes later, the concentration of the cytochrome C in the filtrate is found to be 0.5 ppm. After further conducting the filtration for 1 hour, the solution is discharged from the module. An aqueous alkali solution (pH 14) is flowed through the module and the filtrate is collected. The amount of the cytochrome C in the collected filtrate is found to be 96 % of the theoretical amount.

Then, the module is washed with an aqueous alkali solution (pH 14). Then, as a feed, an aqueous cytochrome C solution (pH 8.4) is flowed through the module in substantially the same manner as mentioned above. As a result, it is found that the concentration of the cytochrome C in the filtrate is 0.6 ppm. This shows that the capacity for selective cation-adsorption is maintained even after the washing with an alkali solution. The filtration is conducted 100 times in substantially the same manner as mentioned above. However, the capacity for selective cation-adsorption is substantially unchanged.

EXAMPLE 4

50 g of PVA-grafted matrix as obtained in Example 2 is immersed in 700 g of an aqueous monochloroacetic acid solution having a monochloroacetic acid concentration of 75 % by weight at room temperature for about 30 min. Then, the membrane is taken out from the solution and immediately put into 1000 g of an aqueous NaOH solution having an NaOH concentration of 50 % by weight heated at a temperature of 90° C. Then, the reaction is conducted at 90 to 100° C. for 20 min and the resultant membrane is washed with water. The thus obtained porous membrane comprises neutral hydroxyl groups in an amount of 4.6 milliequivalents per gram of the porous membrane and carboxyl groups in an amount of 0.4 milliequivalent per gram of the porous membrane, and has a porosity of 70 % and an average pore diameter of 0.35 μm.

EXAMPLE 5

50 g of the porous membrane obtained in Example 4 is immersed again in an aqueous monochloroacetic acid solution having a monochloroacetic acid concentration of 75 % by weight at room temperature for about 30 min. Then, the membrane is taken out from the solution and immediately put into 1000 g of an aqueous NaOH solution having an NaOH concentration of 50 % by weight heated at a temperature of 90° C.

Then, a reaction is conducted at 90° to 100° C. for 20 min and the resultant membrane is washed with water. The thus obtained porous membrane comprises neutral hydroxyl groups in an amount of 3.9 milliequivalents per gram of the porous membrane and carboxyl groups in an amount of 0.8 milliequivalent per gram of the porous membrane, and has a porosity of 70 % and an average pore diameter of 0.35 μm.

Using the porous membrane, a module having a membrane surface area of 1 m² as described in Example 1 is prepared.

Then, as a feed, a solution containing 600 ppm of a cytochrome C (pH 8.4) is flowed through the module at a flow rate of 20 l/hr.m2. 20 Minutes later, the concentration of the cytochrome C in the filtrate is found to be 0.5 ppm. This shows that the cytochrome C is selectively adsorbed on the porous membrane. Further, the filtration is conducted for 1 hour and the solution is discharged from the module. An aqueous alkali solution (pH 14) is flowed through the module and the filtrate is collected. The amount of the cytochrome C in the collected filtrate is found to be 96 % of the theoretical amount.

Then, the module is washed with an aqueous alkali solution (pH 14). Using the treated module, the filtration is conducted in substantially the same manner as mentioned above. As a result, it is found that the concentration of the cytochrome C in the filtrate is 0.6 ppm. This shows that the capacity for selective cation-adsorption is maintained even after the washing with an alkali solution.

The flowing of a feed through the module is repeatedly conducted 100 times in substantially the same manner as mentioned above. However, the capacity for selective cation-adsorption is substantially unchanged.

COMPARATIVE EXAMPLE 3

Using the PVA-grafted matrix obtained in Example 2, a module having a membrane surface area of 1 m² as described in Example 1 is prepared. Then, a feed is flowed through the module in substantially the same manner as in Example 3, 20 Minutes later, the concentration of cytochrome C in the filtrate is found to be 597 ppm. This means that substantially no cytochrome C is adsorbed in the module.

COMPARATIVE EXAMPLE 4

Substantially the same procedure as in Example 16 of U.S. Pat. No. 4,794,002 is repeated except that a polyethylene-made membranous, porous resin matrix obtained in Reference Example is used instead of the polypropylene-made membrane, to thereby obtain a polyethylene-made membrane, both surfaces of which are coated with a crosslinked blue dextran having an active group bonded thereto. The obtained membrane assumes a blue color, reflecting the color of the dextran coated thereon.

The membrane is immersed in boiling water having a temperature of 120° to 125° C. for 24 hr in an autoclave. As a result, it is found that the color of the membrane becomes almost white and the water used turns to light blue color. This shows that the crosslinked blue dextran layer, which is coated on the surface of the polyethylene-made membrane, cannot resist the action of the boiling water at a temperature of 120° to 125° C. and the layer is peeled off from the membrane.

On the other hand, the porous membranes of Examples 1 to 5 of the present invention are treated with boiling water in the same manner as mentioned above. As a result, it is found that the amounts of the hydroxyl groups and the ion exchange groups of the side chains which are chemically bonded to the resin matrix are substantially unchanged. This shows that the porous membrane of the present invention is excellent in heat resistance.

What is claimed is:

1. A selectively ion-adsorptive, porous membrane comprising:

a membranous, porous resin matrix comprising a hydrophobic polyolefin or a hydrophobic copolymer of an olefin and a halogenated olefin; and a plurality of side chains each having at least one end chemically bonded directly to the surfaces of the membranous, porous resin matrix, which in turn are inclusive of pore wall surfaces of the membranous porous resin matrix, said plurality of side chains each comprising at least one functional group selected from the group consisting of a neutral hydroxyl group and an ion exchange group, with the proviso that said plurality of side chains collectively contain both neutral hydroxyl groups and ion exchange groups, wherein the amount of said neutral hydroxyl groups and said ion exchange groups are, respectively, 0.1 to 20 milliequivalents and 0.1 to 20 milliequivalents per gram of the porous membrane, and wherein said plurality of side chains each independently contains at least one combination of groups selected from the group consisting of a combination of groups (a) and (b), a combination of groups (a), (c) and (d), a combination of groups (a), (b), (c) and (d), a combination of groups (a), (b) and (e) and a combination of groups (a), (b), (d) and (e), said group (a) being represented by the formula:

wherein each of $R^1$ and $R^2$ independently represents a hydrogen atom, a halogen atom, an alkyl group having 1 to 3 carbon atoms or a substituted alkyl group having 1 to 3 carbon atoms, said group (b) being represented by the formula:

wherein $R^3$ has the same meaning as defined with respect to each of $R^1$ and $R^2$, said group (c) being represented by the formula:

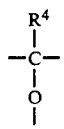

wherein $R^4$ has the same meaning as defined with respect to each of $R^1$ and $R^2$, said group (d) being represented by the formula:

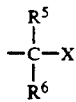

wherein each of $R^5$ and $R^6$ has the same meaning as defined with respect to each of $R^1$ and $R^2$, and X represents an ion exchange group, said group (e) being represented by the formula:

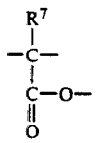

wherein $R^7$ has the same meaning as defined with respect to each of $R^1$ and $R^2$, wherein said group (d) is bonded to the oxy group of said group (c) or (e) directly or through at least one of said groups (a) and (b);

said ion-adsorptive, porous membrane having an average pore diameter of 0.01 to 5 μm and a porosity of 20 to 90%.

2. The porous membrane according to claim 1, which is a hollow fiber membrane having an inner diameter of 0.1 to 10 mm and a membrane thickness of 0.05 to 5 mm.

3. The porous membrane according to claim 1, wherein said plurality of side chains each independently consist essentially of said at least one combination of groups which is selected from a combination of said groups (a) and (b), a combination of said groups (a), (c) and (d), and a combination of said groups (a), (b), (c) and (d), wherein said group (d) is bonded to the oxy group of said group (c) directly or through at least one of said groups (a) and (b).

4. The porous membrane according to any one of claims 2, 3 and 1, wherein said ion exchange group is an anion exchange group.

5. The porous membrane according to any one of claims 2, 3 and 1, wherein said ion exchange group is a cation exchange group.

* * * * *